United States Patent [19]
Kato et al.

[11] Patent Number: 5,978,104
[45] Date of Patent: Nov. 2, 1999

[54] SHEET DISCHARGE MECHANISM AND APPARATUS INCORPORATING THE SAME

[75] Inventors: Hiroyuki Kato, Nagoya; Takashi Ohama, Iwakura, both of Japan

[73] Assignee: Brother Kogyo Kabushiki Kaisha, Nagoya, Japan

[21] Appl. No.: 09/089,117

[22] Filed: Jun. 3, 1998

[30]  Foreign Application Priority Data

Jun. 17, 1997 [JP] Japan ................................. 9-159719

[51] Int. Cl.$^6$ ............................................. H04N 1/04
[52] U.S. Cl. ................................. 358/498; 358/401
[58] Field of Search .................... 358/474, 488,
358/494, 498, 486, 401; 355/407, 81, 82,
97; 271/3, 14, 4.01, 280, 281, 307, 184,
185, 82

[56]  References Cited

U.S. PATENT DOCUMENTS 4,867,436  9/1989  Hanada ................................. 271/221
5,173,785  12/1992  Muramatsu ............................ 358/400
5,532,809  7/1996  Hamanaka ............................ 355/308

*Primary Examiner*—Jerome Grant, II
*Attorney, Agent, or Firm*—Oliff & Berridge, PLC

[57]  ABSTRACT

A sheet discharge mechanism arranged for preventing improper sheet transfer includes discharge rollers for moving a sheet held in contact therewith, and barrier members for preventing the sheet from being transferred in an unintended direction. Each barrier member includes a blocking portion, a looped portion continuous with the blocking portion, and a fixing portion continuous with the looped portion. The fixing portion is attached to the blocking portion by adhesive tape. The sheet discharge mechanism further includes a rotary shaft extending through the looped portion. The looped portion of the barrier member is greater in diameter than the rotary shaft.

15 Claims, 5 Drawing Sheets

SHEET DISCHARGE MECHANISM AND APPARATUS INCORPORATING THE SAME

BACKGROUND OF THE INVENTION

1. Field of the Invention

The present invention relates to a sheet discharge mechanism used in a printer or facsimile machine for example. In particular, the present invention relates to a sheet discharge mechanism capable of discharging paper sheets without causing sheet transfer errors. The present invention also relates to apparatus incorporating such a sheet discharge mechanism.

2. Description of the Related Art

As is well known, a typical sheet discharge mechanism may include a rotatable shaft driven by a suitable actuator, and a plurality of discharge rollers fixed to the shaft. The discharge mechanism may also include urging members arranged in facing relation to the discharge rollers for contacting paper sheets with the discharge rollers. In use, the discharge rollers are rotated together with the shaft, so that a paper sheet held in contact with the discharge rollers is moved in a predetermined direction to be discharged into a tray for example.

The conventional sheet discharge mechanism has the following problem. Specifically, to be properly discharged into the tray, the paper sheet, once detached from the discharge rollers, needs to keep a sufficient distance from the rotating discharge rollers. However, it may occur that the rear end portion of the paper sheet, once released, is accidentally brought back into contact with the discharge rollers. When this happens, the paper sheet is unduly drown back into the printer, which may lead to breakdown of the printer.

SUMMARY OF THE INVENTION

It is, therefore, an object of the present invention is to provide a sheet discharge mechanism capable of overcoming the problem described above.

Another object of the present invention is to provide a printer incorporating such a sheet discharge mechanism.

Still another object of the present invention is to provide a facsimile machine incorporating such a sheet discharge mechanism.

According to a first aspect of the present invention, there is provided a sheet discharge mechanism arranged for preventing improper sheet transfer comprising:

at least one discharge roller for moving a sheet held in contact therewith; and at least one barrier member for preventing the sheet from being transferred in an unintended direction.

With such an arrangement, improper sheet transfer is advantageously blocked by the barrier member.

According to a preferred embodiment, the sheet discharge mechanism further comprises a rotary shaft, wherein the discharge roller is fixed to the rotary shaft, and the barrier member is supported by the rotary shaft for free rotation.

The barrier member may include a blocking portion, a looped portion continuous with the blocking portion, and a fixing portion continuous with the looped portion. The fixing portion is attached to the blocking portion by a fixing member, and the rotary shaft extends through the looped portion.

Preferably, the looped portion is greater in diameter than the rotary shaft, while the blocking portion is longer than the fixing portion.

The fixing member may comprise adhesive tape.

The sheet discharge mechanism may further comprise a sensor at a position corresponding to the barrier member for detecting a reference mark printed on the sheet. In this case, the barrier member is preferably black.

According to a preferred embodiment, the sheet discharge mechanism comprises a plurality of discharge rollers spaced from each other, and a plurality of barrier members spaced from each other.

Alternatively, the sheet discharge mechanism may comprise a single barrier member having one blocking portion and a plurality of looped portions continuous with the blocking portion.

According to a second aspect of the present invention, there is provided a printer for printing on recording sheets comprising:

a sheet transfer mechanism for feeding each recording sheet;

a print head for printing on said each recording sheet fed by the sheet transfer mechanism; and a sheet discharge mechanism for discharging said each recording sheet, the sheet discharge mechanism comprising at least one discharge roller for moving said each recording sheet held in contact therewith, and at least one barrier member for preventing said each recording sheet from being transferred in an unintended direction.

According to a third aspect of the present invention, there is provided a facsimile machine incorporating a printer for printing on recording sheets, the printer comprising:

a sheet transfer mechanism for feeding each recording sheet;

a print head for printing on said each recording sheet fed by the sheet transfer mechanism; and a sheet discharge mechanism for discharging said each recording sheet, the sheet discharge mechanism comprising at least one discharge roller for moving said each recording sheet held in contact therewith, and at least one barrier member for preventing said each recording sheet from being transferred in an unintended direction.

Other objects, features and advantages of the present invention will be apparent from the detailed description of the embodiment given below with reference to the accompanying drawings.

DETAILED DESCRIPTION OF THE PREFERRED EMBODIMENT

The preferred embodiments of the present invention will be described below with reference to the accompanying drawings.

Figure 1:
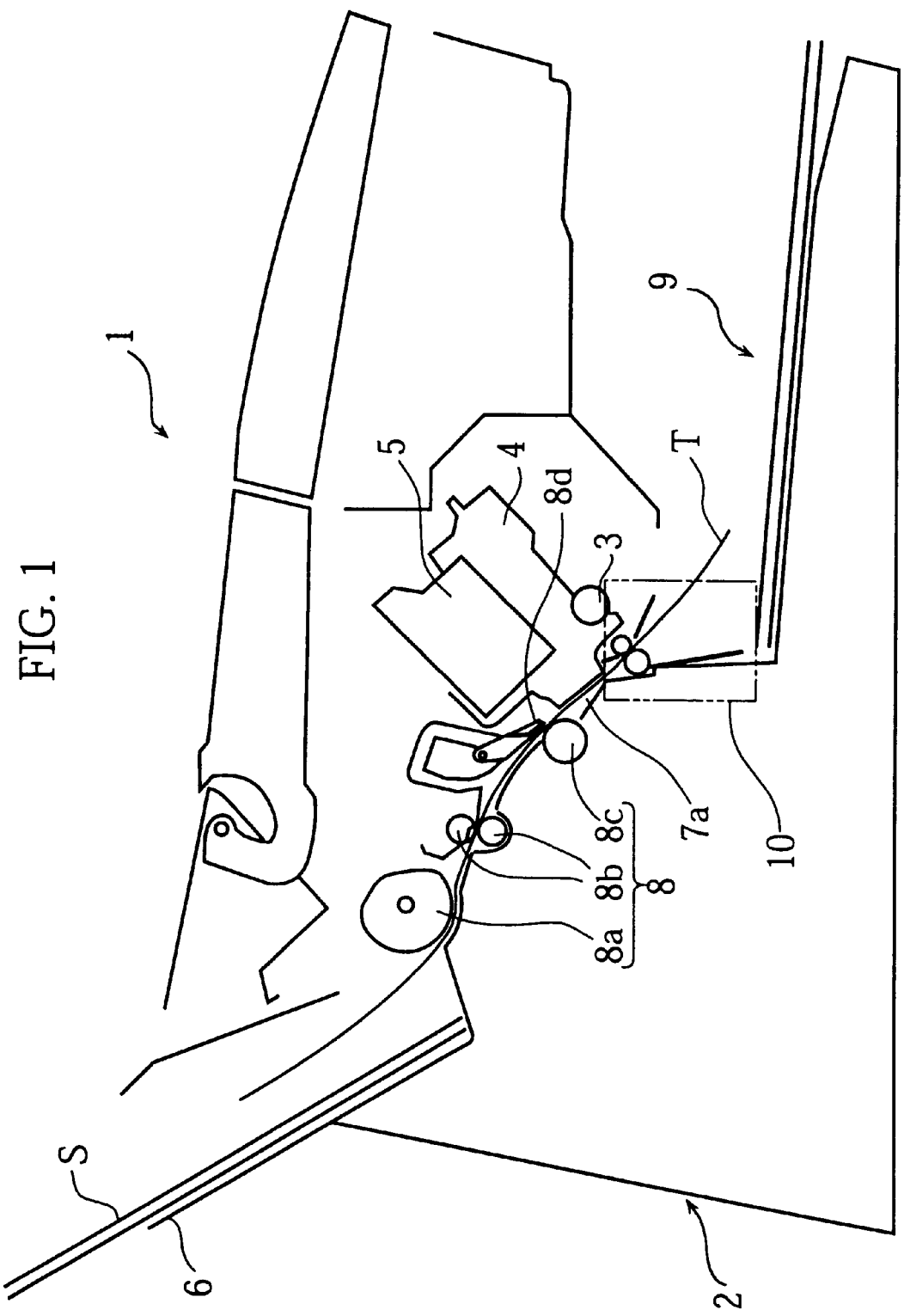
FIG. 1 is a sectional side view showing a facsimile machine embodying the present invention.
Figure 2:
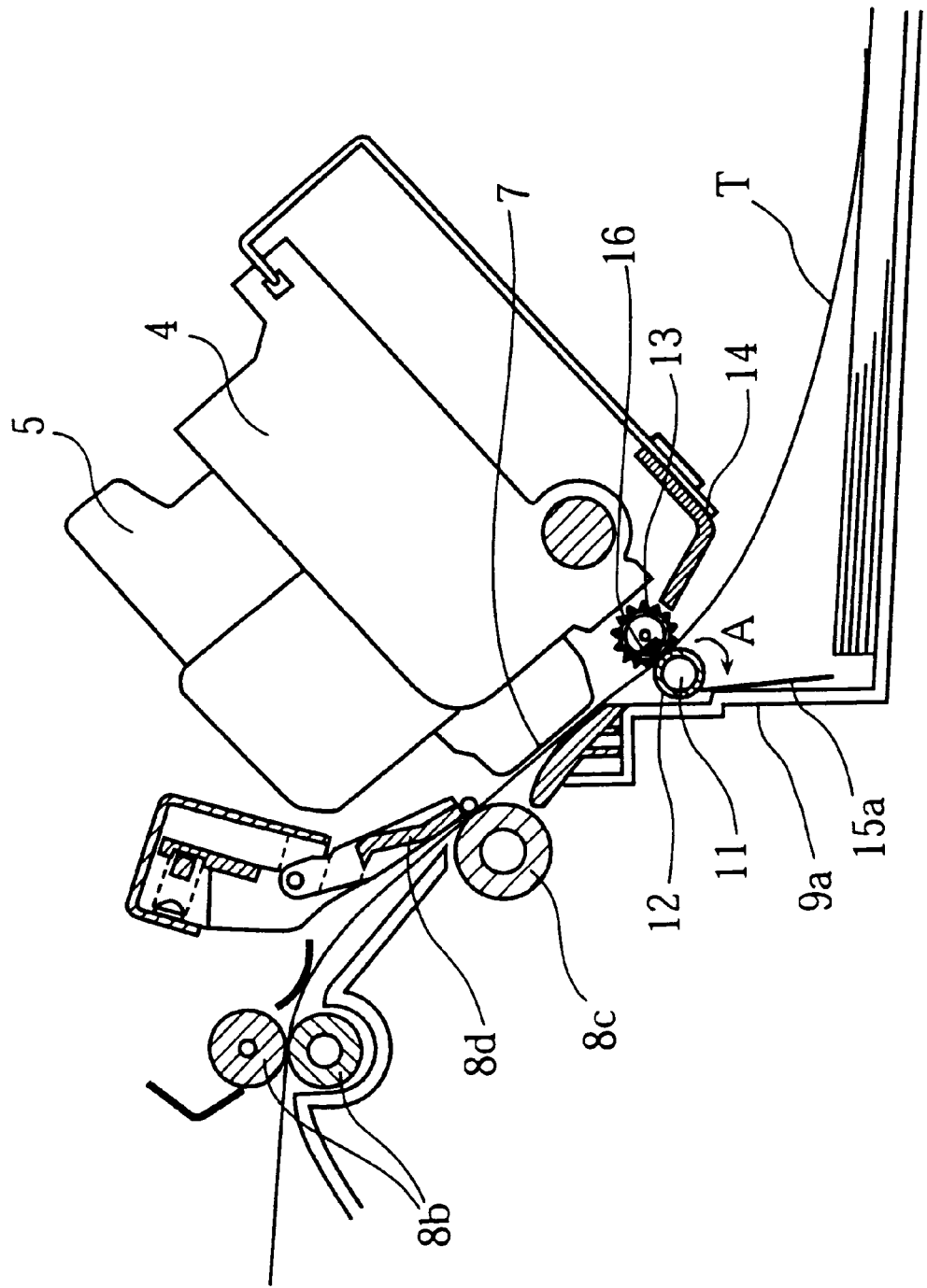
FIG. 2 is an enlarged side view showing principal parts of a printer incorporated in the facsimile machine.

Reference is first made to FIGS. 1 and 2. Of these figures, FIG. 1 is a sectional side view schematically showing a facsimile machine 1 embodying the present invention. The facsimile machine 1 includes, among other things, a housing 2, and a printer which will be described in detail hereinafter. FIG. 2 is an enlarged view showing principal parts of the printer. In the illustrated embodiment, the printer may be an inkjet printer. However, this is not limitative, and other printers of various types may be usable.

The above printer includes an elongated guide rail 3 fixed to the housing 2 and extending horizontally, a carriage 4 movable along the guide rail 3, an ink cartridge 5 carried by the carriage 4, a paper tray 6 for holding recording paper sheets (S), a print head 7 supported by the carriage 4, a transfer mechanism 8 and a paper stacker 9 for holding discharged paper sheets. For enabling proper discharge of the paper sheets (S), the printer is provided with a discharge mechanism 10 capable of preventing improper transfer of the sheets (S), as will be described hereinafter.

In use, each recording paper sheet (S) is transferred from the paper tray 6 to a printing section 7a by the transfer mechanism 8. At the printing section 7a, predetermined images are printed on the recording paper sheet (S) by the print head 7. Thereafter, the printed sheet (S) is discharged into the stacker 9 by the discharge mechanism 10, as mentioned above. A transfer path for the recording paper sheet (S) is designated by reference T in FIGS. 1 and 2. As can be seen, the guide rail 3 supporting the carriage 4 extends in a direction perpendicular to the transfer path (T). This direction may be referred to as "the transverse direction" hereinafter.

The carriage 4 is reciprocated along the guide rail 3 by a suitable actuation mechanism (not shown) including a stepping motor, a transmission and the like. As best shown in FIG. 2, the print head 7 supported by the carriage 4 is held in facing relation to the transfer path (T). The print head 7 is supplied with ink from the ink cartridge 5. In printing, the print head 7 will be reciprocated in the transverse direction together with the carriage 4.

The transfer mechanism 8 includes a first roller 8a, a pair of second rollers 8b and a third roller 8c. These rollers are arranged along the transfer path (T) between the paper tray 6 and the printing section 7. The first roller 8a is provided for picking up a recording sheet (S) in the paper tray 6 and sending it to the second rollers 8b. The second rollers 8b are vertically arranged in a facing manner. In this arrangement, the recording sheet (S) from the first roller 8a is guided between the two second rollers 8b to be moved toward the third roller 8c. An urging member 8d is arranged in facing relation to the third roller 8c, with the transfer path (T) extending therebetween. The urging member 8d is provided for bringing the recording sheet (S) into contact with the third roller 8c with suitable force. Thus, the recording sheet (S) is properly moved forward by the third roller 8c to the printing section 7a. After images are printed on the recording sheet (S) by the print head 7, the recording sheet is discharged into the stacker 9 by the sheet discharge mechanism 10.

Figure 3:
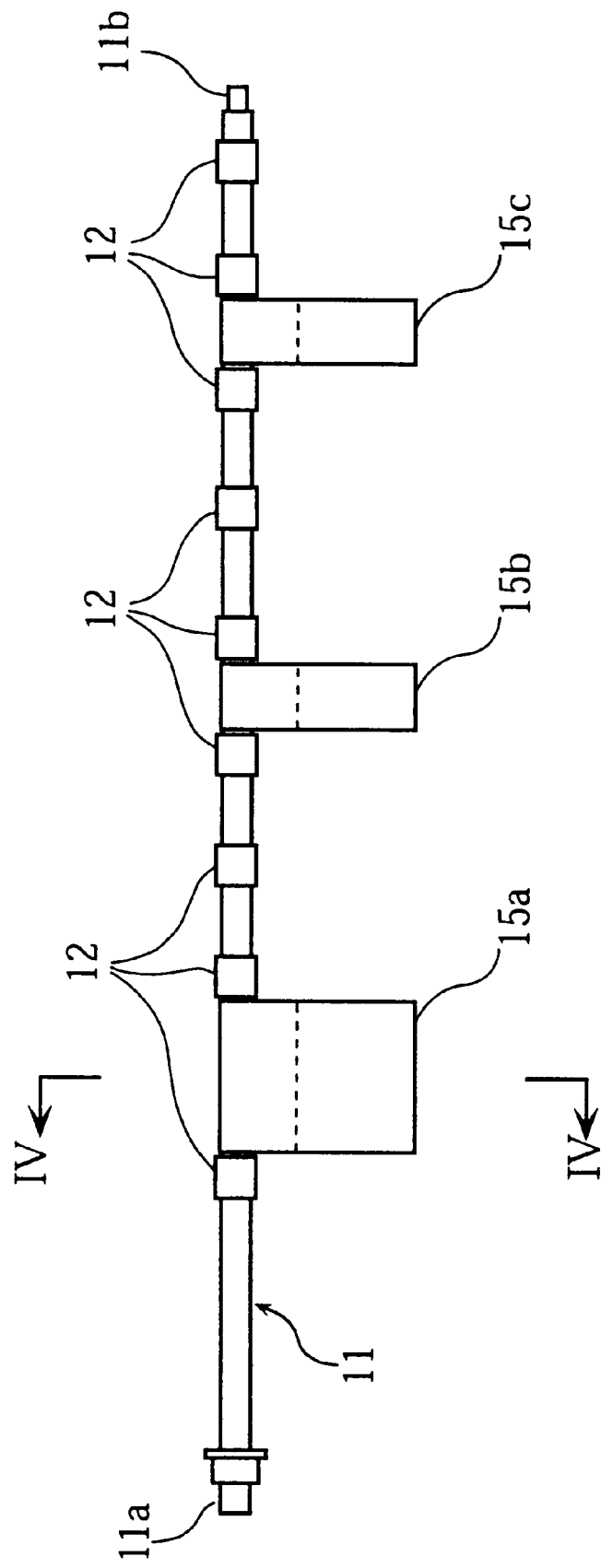
FIG. 3 illustrates barrier members supported by a rotary shaft.

Referring to FIGS. 2 and 3, the sheet discharge mechanism 10 includes a rotation shaft 11 extending in the transverse direction. As shown in FIG. 3, the shaft 11 is externally provided with a plurality of discharge rollers 12 arranged at predetermined intervals along the length of the shaft 11. The discharge rollers 12 may be made of an elastic material such as rubber. The discharge rollers 12 are positionally fixed to the shaft 11.

The sheet discharge mechanism 10 also includes a plurality of urging members 13 which may correspond in number and in position to the discharge rollers 12. The urging members 13 are carried by a suitable supporting member 14 (fixed to the housing 2) for rotation about a horizontal axis. Each urging member 13 is formed with radially extending projections as in a spur. As can be seen from FIG. 2, the urging member 13 is held in facing relation to the corresponding discharge roller 12, so that the printed paper sheet (S) to be discharged is properly brought into contact with the discharge roller 12.

As best shown in FIG. 3, the sheet discharge mechanism 10 also includes three barrier members 15a–15c supported by the shaft 11 between adjacent discharge rollers 12. As will be described hereinafter, the barrier members 15a–15c are advantageously used for preventing the paper sheet (S) from being transferred in an unintended direction when the paper sheet (S) is about to be discharged into the stacker 9.

Figure 4:
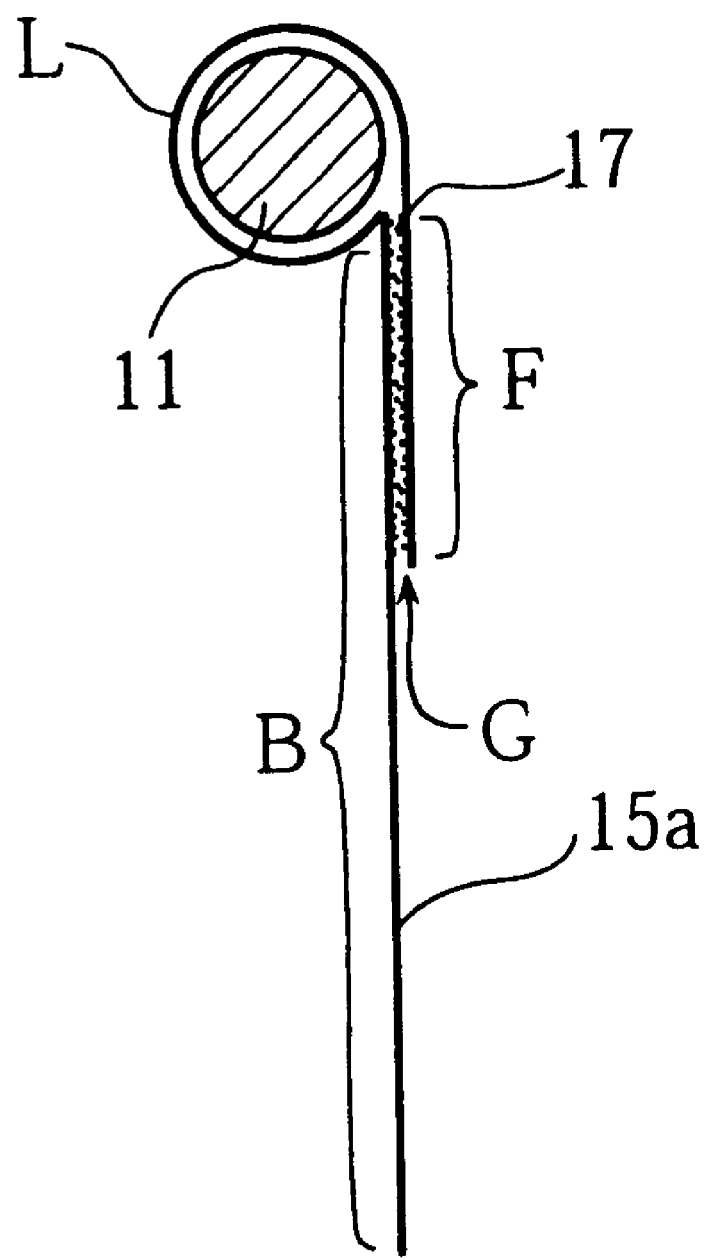
FIG. 4 is a sectional view taken along lines IV—IV in FIG. 3.

FIG. 4 is a sectional view taken along lines IX—IX in FIG. 3. The illustrated element is the barrier member 15a, and the following description given in connection with FIG. 4 is about the barrier member 15a. However, as is easily understood, the same description will be applicable to the other barrier members 15b and 15c. Thus, separate description for the other barrier members will not be given, unless such is particularly necessary.

As is shown, the barrier member 15a has a straight blocking portion B extending downward below the shaft 11. The barrier member also has a looped portion L continuous to the blocking portion B. The barrier member further includes a fixing end portion F attached to the blocking portion B by suitable fixing means 17 such as an adhesive material or adhesive tape, for example. As viewed vertically, the blocking portion B is longer than the fixing end portion F.

As is seen from FIG. 4, the inner diameter of the looped portion L is made greater than the diameter of the shaft 11, so that space is provided between the looped portion L and the shaft 11. In this arrangement, even when the shaft 11 is rotated in a clockwise direction (shown by an arrow A in FIG. 2) for discharging the paper sheet (S), the barrier member 15a is not rotated together with the shaft 11, but (substantially) remains in the initial hanging posture due to gravity. In the case shown in FIG. 2, the clockwise movement of the barrier member 15a is also prevented by an upright wall 9a behind the barrier member 15a.

The barrier member described above is easily obtained from a rectangular, thin film, which may be made of a resin material for example. Preferably, the film is flexible enough so that the looped portion L is easily formed.

As shown in FIG. 2, the barrier member 15a is supported by the shaft 11 in a manner such that the blocking portion B faces in a forward or sheet-feeding direction (to the right in the figure), while the fixing end portion F faces in a backward direction to the sheet-feeding direction. With such an arrangement, the paper sheet (S) to be discharged may come into contact with only the blocking portion B but not with the fixing end portion F. This is advantageous because, if otherwise, the paper sheet (S) might be caught in a possible gap (G) formed between the blocking portion B and the fixing end portion F (see FIG. 4).

Referring to FIG. 3, the blocking portions of the respective barrier members 15a–15c are equal in length but different in width. As is seen, the width of the barrier member 15a is greater than those of the other barrier members 15b–15c (the barrier members 15b–15c are equal in width). However, this is not limitative. For example, the second barrier member 15b may be made greater in width than the other members 15a and 15c, or all of the barrier members 15a–15c may be equal in width. Further, the lengths of the barrier members 15a–15c may be made different. The blocking portion of each barrier member is not necessarily rectangular in shape, but may have a triangular form tapering downward.

It is also possible to provide each barrier member with some additional weight. Such weight may preferably be arranged at the free end portion of the blocking portion of each barrier member. In this way, the barrier member is more reliably held in the initial hanging posture.

In the illustrated embodiment, three barrier members 15a–15c are provided for dealing with various recording paper sheets of different sizes. However, the number is not limitative. Depending on applications, only one barrier member (see FIG. 5) or more than three members may be provided.

In the facsimile machine 1 according to the present invention, arrangements are also made for monitoring the amount of the ink present in the ink cartridge 5. Specifically, the sheet discharge mechanism 10 includes a sensor 16 carried by the supporting member 14, and a light source (not shown) associated with the sensor 16. As can be seen from FIG. 2, the sensor 16 is arranged adjacent to, and obliquely above, the shaft 11 and transfer path (T). As viewed in the transverse direction, the sensor 16 is disposed at a position corresponding to the barrier member 15a.

The above-mentioned ink-monitoring operation is performed by utilizing a reference mark printed on the paper sheet (S) at the printing section 7a. Detailed description is given below.

When the paper sheet (S) is brought to the printing section 7a for printing predetermined images, a small reference mark is additionally printed, for example on a rear portion of the paper sheet (S). The paper sheet (S) thus marked is sent to the discharge mechanism 10. Before the paper sheet (S) is discharged, the unillustrated light source illuminates the above reference mark, while the sensor 16 receives reflected light coming from the reference mark.

Now, it is supposed that there is a sufficient amount of ink in the ink cartridge 5 at the time of printing the above-mentioned predetermined images and the reference mark. In this case, the ink is properly supplied to the print head 7, and the reference mark will be printed properly (namely, without being faint or even unprinted at some portions). As a result, the reflection of the illuminating light by the fully-printed reference mark is minimized (note that light is absorbed by a black body), whereby the sensor 16 detects minimum luminous energy.

On the other hand, as the ink in the ink cartridge 5 reduces, the reference mark may fail to be properly printed. Then, light reflection by the reference mark is increased, whereby luminous energy detected by the sensor 16 will also increase. Finally, when no ink is present in the ink cartridge 5, no reference mark is formed on the paper sheet (S), thereby maximizing the luminous energy detected by the sensor 16.

As can be seen from the above description, it is possible to obtain information about the amount of ink present in the ink cartridge 5 by knowing the luminous energy of the reflected light detected by the sensor 16.

Description will now be made to the function and the advantages of the sheet discharge mechanism 10. As previously described, after predetermined images and a reference mark are printed at the printing section 7a, the paper sheet (S) is sent to the discharge mechanism 10. For discharging the printed paper sheet (S), the shaft 11 and the discharge rollers 12 of the discharge mechanism 10 are rotated as shown by the arrow A (clockwise) in FIG. 2. In this condition, the paper sheet (S), which is properly held in contact with the discharge rollers 12 by the urging members 13, is moved forward to be discharged into the stacker 9 due to gravity.

In the discharging procedure, as already described in connection with the prior art, the rear end of the paper sheet (S) may not be properly detached from the discharge rollers 12, whereby the sheet (S) may unduly be moved backward. However, according to the present invention, such an unfavorable movement of the sheet (S) is advantageously checked by the barrier members 15a–15c.

In terms of the above function, the color of the barrier members 15a–15c may be arbitrary. However, according to the present invention, an ink-monitoring operation can be performed using the sensor 16, which is arranged adjacent to the barrier member 15a. In such an instance, the barrier members 15a–15c (or at least the barrier member 15a) should be of dark color, preferably black, for the following reasons.

As is easily understood, for obtaining a correct result in the ink-monitoring, it is necessary for the sensor 16 to detect only the reflected light from the reference mark. Thus, care should be taken to prevent unintended light coming from portions other than the reference mark from entering the sensor 16. Since the sensor 16 is disposed at a position corresponding to the barrier member 15a (more specifically, the position is also described as being obliquely above the shaft 11). Thus, the above-mentioned unintended light may be most likely to come from the upright wall 9a behind the barrier member 15a.

However, the above problem is easily overcome by making the barrier member 15a dark-colored, preferably black. In this manner, unfavorable light coming from the upright wall 9a is blocked and absorbed by the barrier member 15a. Further, with such an arrangement, if light falls onto the barrier member 15a, the light is absorbed by the barrier member 15a instead of being reflected toward the sensor 16. In this regard, it should be appreciated that the barrier member 15a has a greater width than the other two barrier members 15b–15c (FIG. 3). Such an arrangement is advantageous in preventing the unwanted light from entering the sensor 16. As mentioned above, the other barrier members 15b–15c may also be made black.

Figure 5:
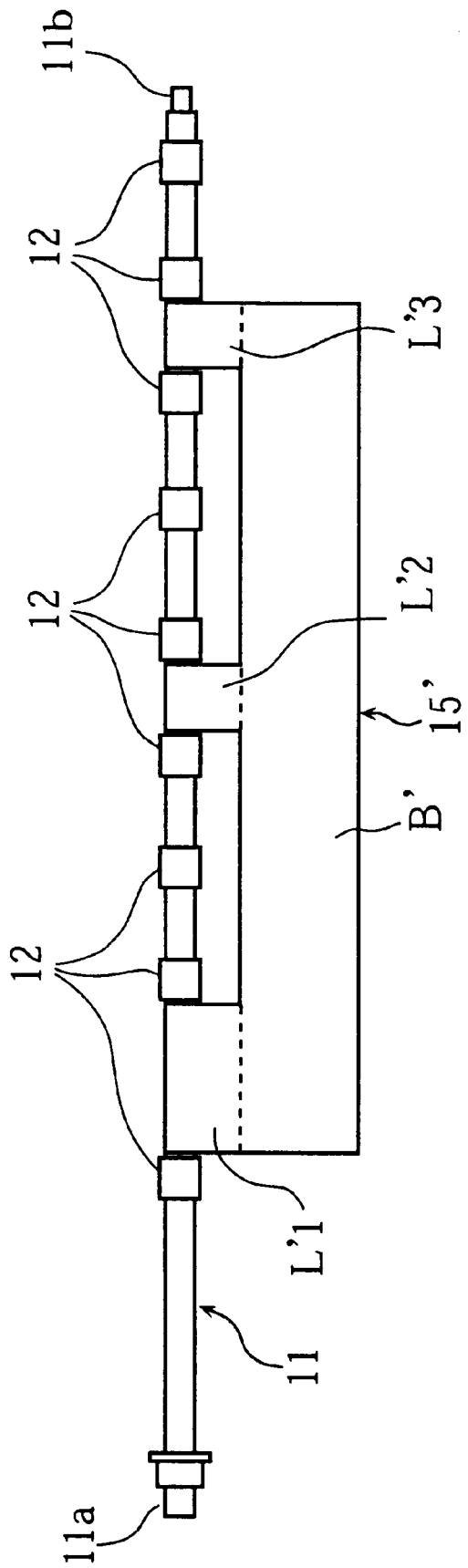
FIG. 5 illustrates a modified barrier member.

FIG. 5 shows a modified barrier member. Differing from the barrier members 15a–15c shown in FIG. 3, the illustrated barrier member 15' has a single blocking portion B' which is horizontally elongated below the shaft 11, and three looped portions L1', L2' and L3' continuous with the blocking portion B'. The barrier member 15' is supported by the shaft 11 via the looped portions L1'–L3' for free rotation relative to the shaft 11, as in the barrier members 15a–15c of FIG. 3. Such a one-piece arrangement is advantageous in keeping the blocking portion B' in its initial hanging posture. Thus, it is possible to more reliably prevent the paper sheet (S) from being unduly moved in an undesired direction. Further, since the blocking portion B' is arranged to continuously extend horizontally, undesired light is more effectively blocked or absorbed by the barrier member B' when it is made black.

The present invention being thus described, it is obvious that the same may be varied in many ways. Such variations should not be regarded as a departure from the spirit and scope of the present invention, and all such modifications as would be obvious to those skilled in the art are intended to be included within the scope of the following claims.

We claim:

1. A sheet discharge mechanism arranged for preventing improper sheet transfer comprising:
   a rotary shaft;
   at least one discharge roller for moving a sheet held in contact therewith, the discharge roller being fixed to the rotary shaft; and
   at least one barrier member for preventing the sheet from being transferred in an unintended direction, the barrier member being supported by the rotary shaft for free rotation independent of the rotary shaft;
   wherein the barrier member includes a blocking portion, a looped portion continuous with the blocking portion, and a fixing portion continuous with the looped portion, the fixing portion being attached to the blocking portion by a fixing member, the rotary shaft extending through the looped portion.

2. The sheet discharge mechanism according to claim 1, wherein the looped portion is greater in diameter than the rotary shaft.

3. The sheet discharge mechanism according to claim 1, wherein the blocking portion is longer than the fixing portion.

4. The sheet discharge mechanism according to claim 1, wherein the fixing member comprises adhesive tape.

5. The sheet discharge mechanism according to claim 1, further comprising a sensor at a position corresponding to the barrier member for detecting a reference mark printed on the sheet, the barrier member being black.

6. The sheet discharge mechanism according to claim 1, comprising a plurality of discharge rollers spaced from each other.

7. The sheet discharge mechanism according to claim 1, comprising a plurality of barrier members spaced from each other.

8. The sheet discharge mechanism according to claim 1, comprising a single barrier member having one blocking portion and a plurality of looped portions continuous with the blocking portion.

9. A printer for printing on recording sheets comprising:
   a sheet transfer mechanism for feeding each recording sheet;
   a print head for printing on said each recording sheet fed by the sheet transfer mechanism; and
   a sheet discharge mechanism for discharging said each recording sheet, the sheet discharge mechanism comprising at least one discharge roller for moving said each recording sheet held in contact therewith, and at least one barrier member for preventing said each recording sheet from being transferred in an unintended direction;
   wherein the sheet discharge mechanism further comprises a sensor at a position corresponding to the barrier member for detecting a reference mark printed on said each recording sheet, the barrier member being black.

10. The printer according to claim 9, wherein the sheet discharge mechanism comprises a plurality of discharge rollers spaced from each other, and a plurality of barrier members spaced from each other.

11. The printer according to claim 9, wherein the sheet discharge mechanism further comprises a rotary shaft, the discharge roller being fixed to the rotary shaft, the barrier member being supported by the rotary shaft for free rotation.

12. The printer according to claim 11, wherein the barrier member includes a blocking portion, a looped portion continuous with the blocking portion, and a fixing portion continuous with the looped portion, the fixing portion being attached to the blocking portion by a fixing member, the rotary shaft extending through the looped portion.

13. The printer according to claim 12, wherein the blocking portion is longer than the fixing portion.

14. A facsimile machine incorporating a printer for printing on recording sheets, the printer comprising:
   a sheet transfer mechanism for feeding each recording sheet;
   a print head for printing on said each recording sheet fed by the sheet transfer mechanism; and
   a sheet discharge mechanism for discharging said each recording sheet, the sheet discharge mechanism comprising at least one discharge roller for moving said each recording sheet held in contact therewith, and at least one barrier member for preventing said each recording sheet from being transferred in an unintended direction;
   wherein the sheet discharge mechanism further comprises a sensor at a position corresponding to the barrier member for detecting a reference mark printed on said each recording sheet, the barrier member being black.

15. The facsimile machine according to claim 14, wherein the sheet discharge mechanism further comprises a rotary shaft, the discharge roller being fixed to the rotary shaft, the barrier member being supported by the rotary shaft for free rotation.

* * * * *